May 28, 1963  J. K. MOSHER  3,091,419
AIRCRAFT IN-FLIGHT REFUELING SYSTEM
Filed Jan. 14, 1957  12 Sheets-Sheet 2

JAMES K. MOSHER,
INVENTOR.

BY
Attorney

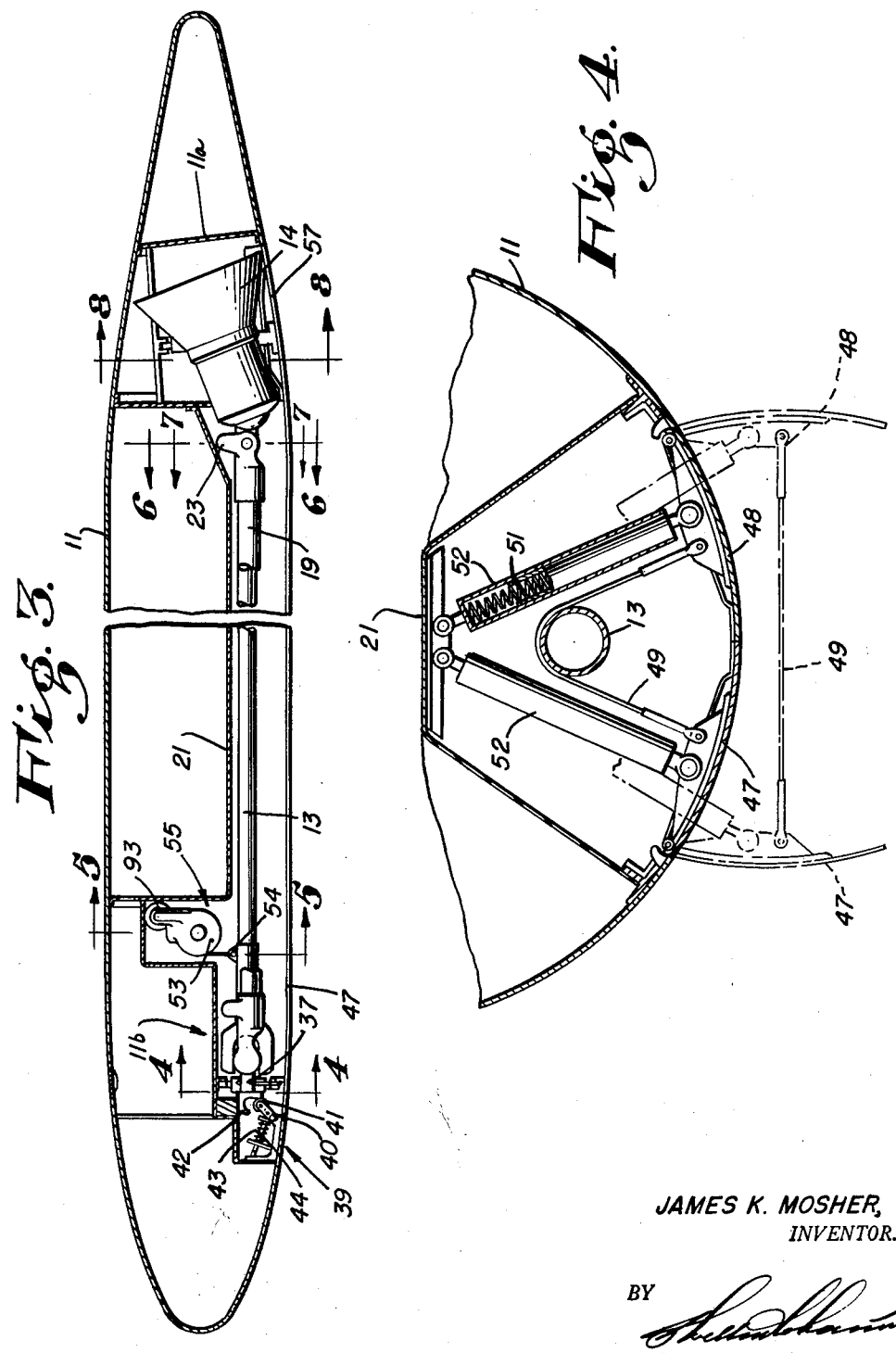

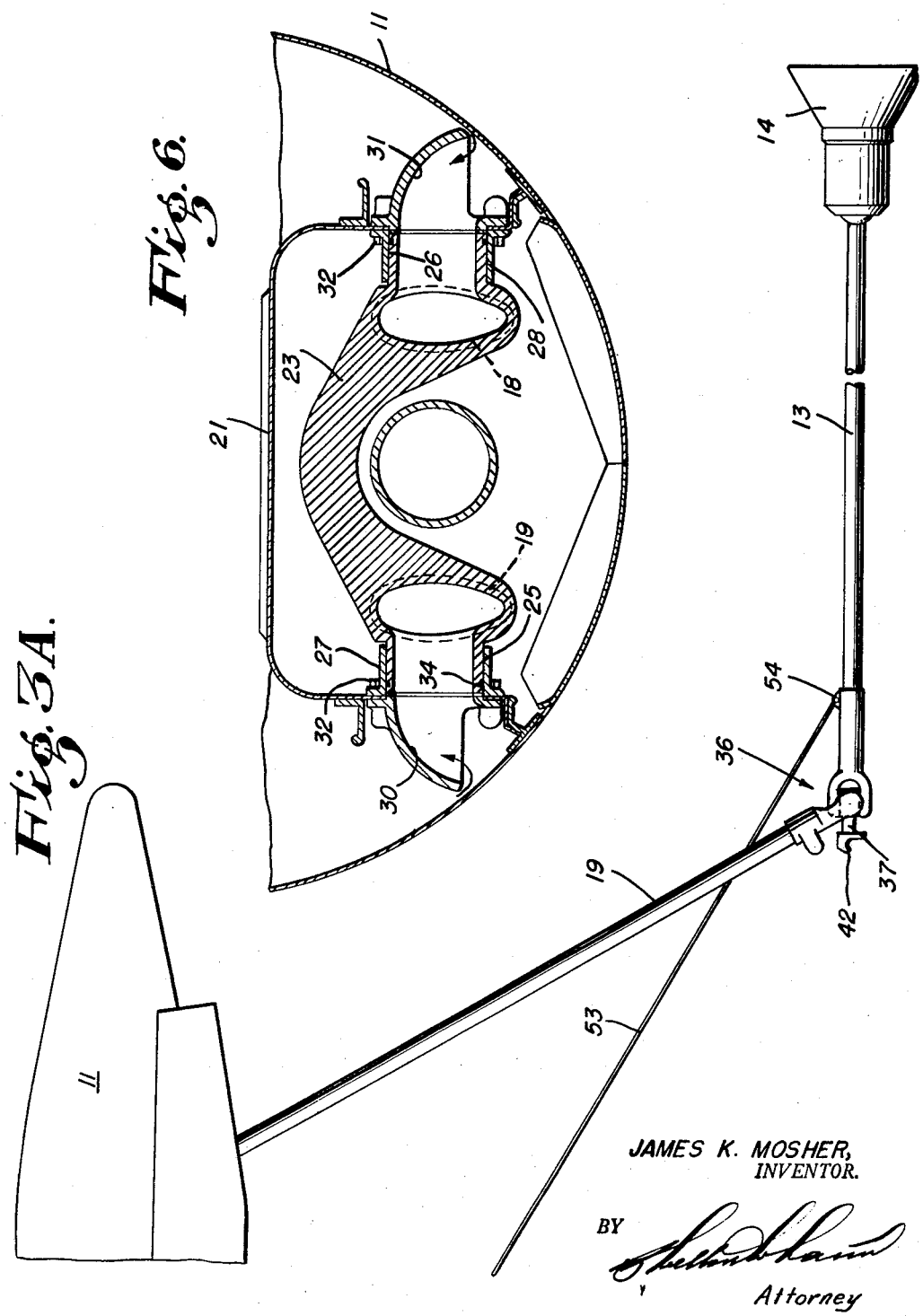

May 28, 1963   J. K. MOSHER   3,091,419
AIRCRAFT IN-FLIGHT REFUELING SYSTEM
Filed Jan. 14, 1957   12 Sheets-Sheet 5
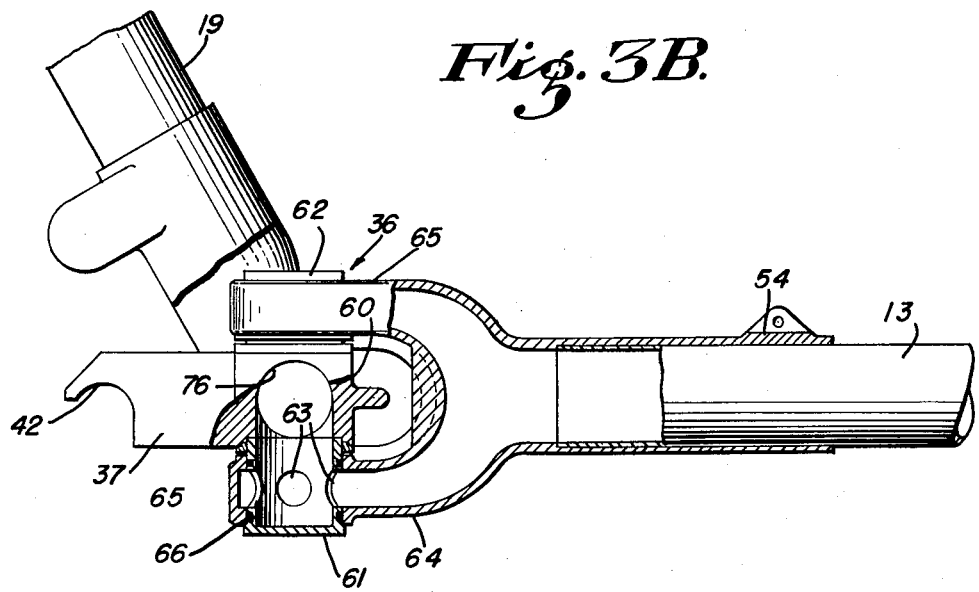
*Fig. 3B.*
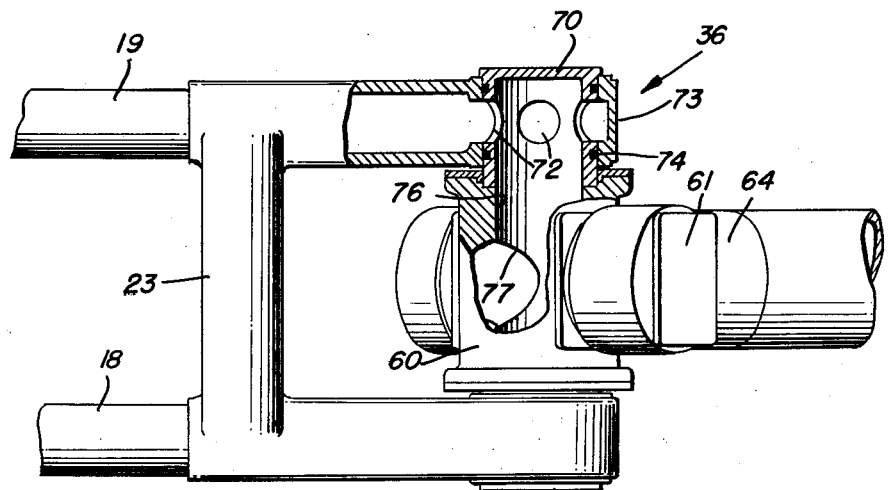
*Fig. 3C.*
JAMES K. MOSHER,
INVENTOR.
BY 
Attorney May 28, 1963  J. K. MOSHER  3,091,419
AIRCRAFT IN-FLIGHT REFUELING SYSTEM
Filed Jan. 14, 1957  12 Sheets-Sheet 6

JAMES K. MOSHER,
INVENTOR.

BY
Attorney

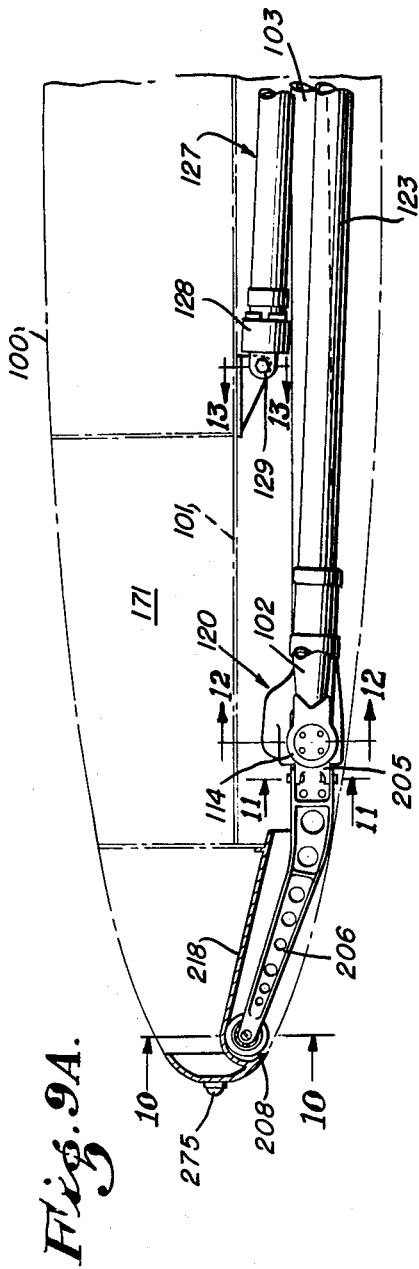

JAMES K. MOSHER,
INVENTOR.

BY
Attorney

May 28, 1963
J. K. MOSHER
3,091,419
AIRCRAFT IN-FLIGHT REFUELING SYSTEM
Filed Jan. 14, 1957
12 Sheets-Sheet 9
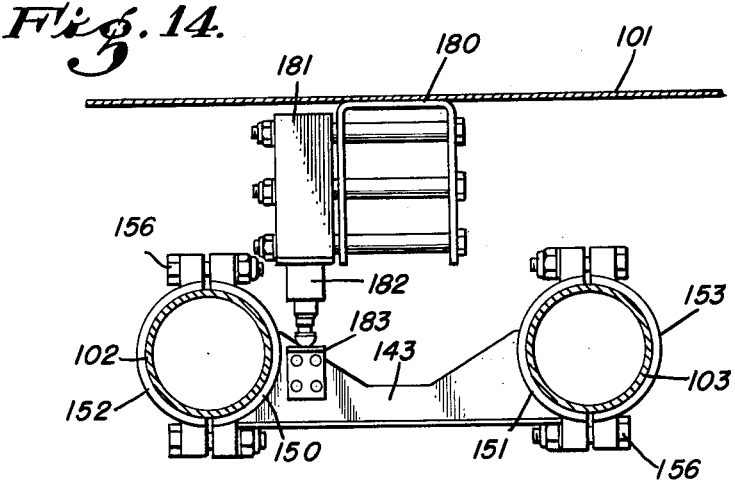
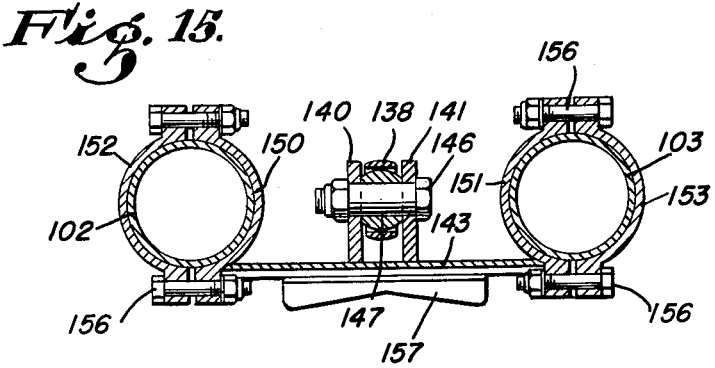
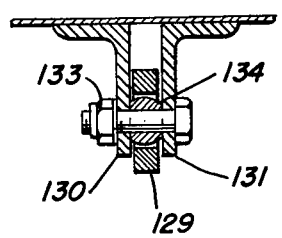
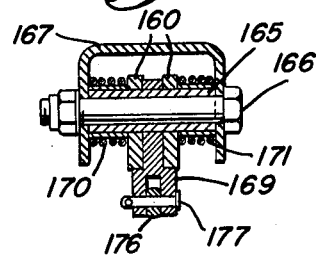
JAMES K. MOSHER,
INVENTOR.
BY *[signature]*
Attorney

JAMES K. MOSHER,
INVENTOR.

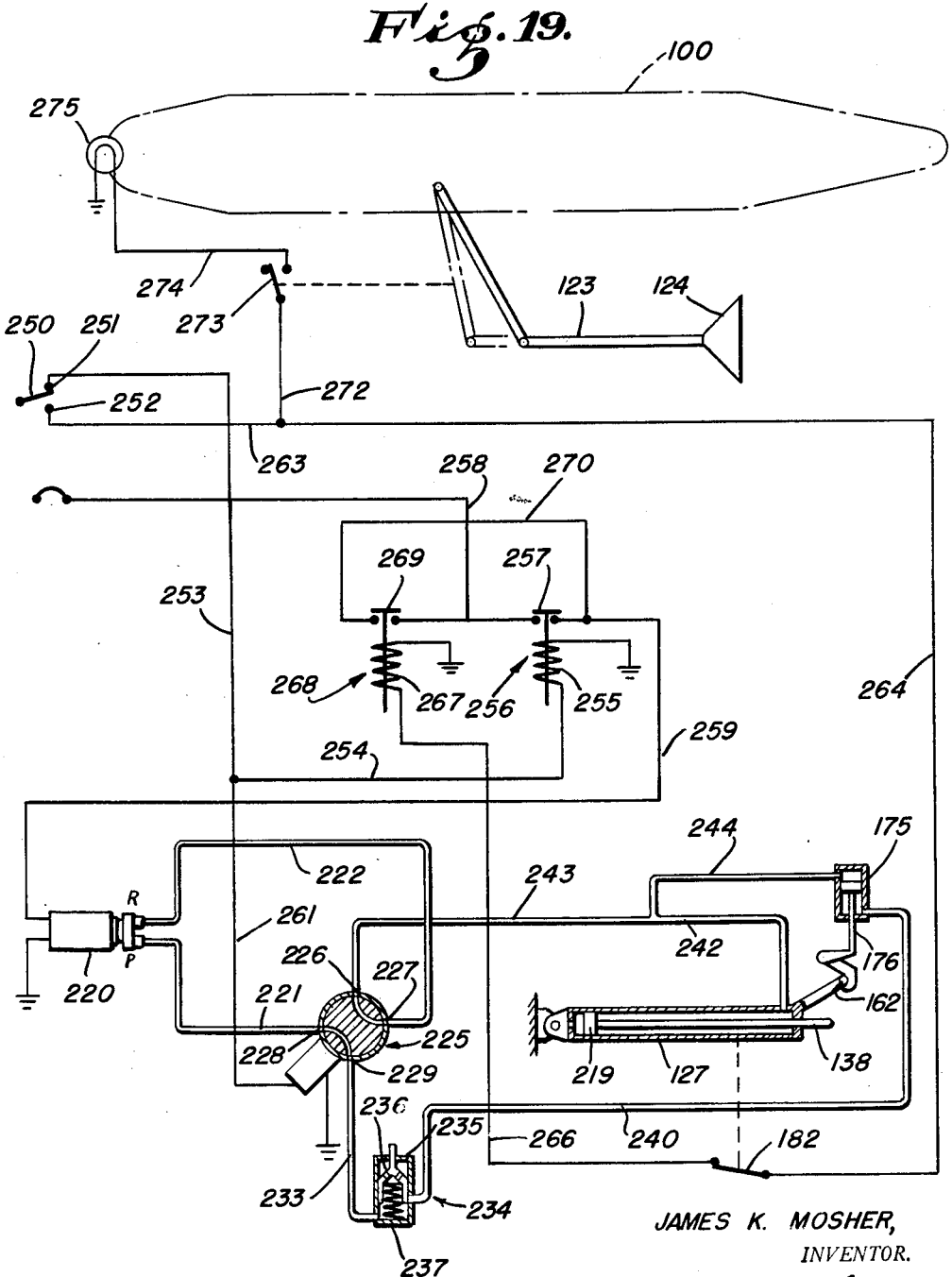

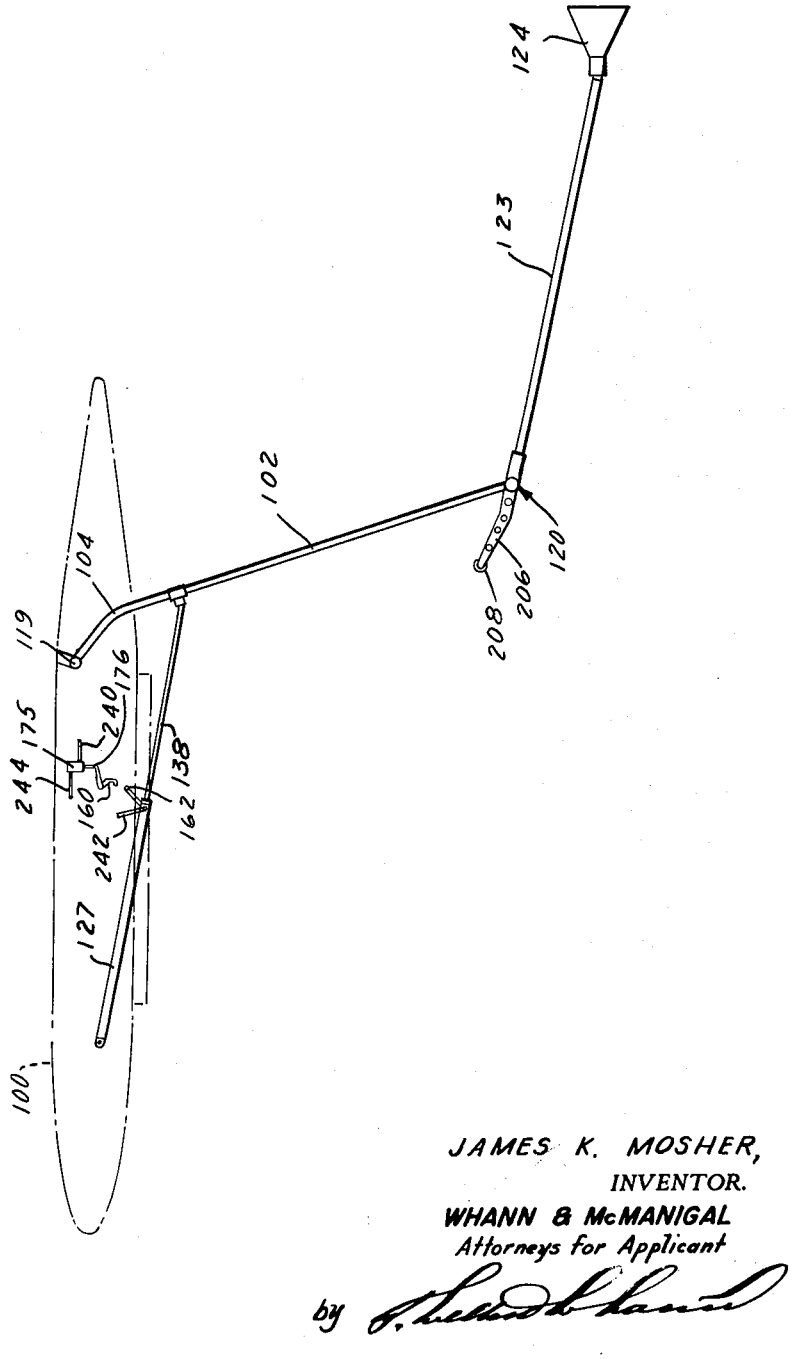

United States Patent Office 3,091,419
Patented May 28, 1963

3,091,419
AIRCRAFT IN-FLIGHT REFUELING SYSTEM
James K. Mosher, Pasadena, Calif., assignor to Schulz Tool and Manufacturing Co., San Gabriel, Calif., a corporation of California
Filed Jan. 14, 1957, Ser. No. 633,903
2 Claims. (Cl. 244—135)

This invention relates to an aircraft in flight refueling system whereby fuel or the like may be transferred from one aircraft to another while in flight. The invention may have application in connection with military aircraft wherein various types of aircraft are fueled in flight from large tanker aircraft.

In the prior art it has been known to fuel one aircraft from another in flight, utilizing a trailing flexible hose from the tanker aircraft. This has presented particular disadvantages in that due to the speed of the aircraft it has been necessary to trail an undesirably long length of hose in order to get it down to a suitably safe level below the tanker aircraft. The system ordinarily utilizes a drogue on the end of the trailing member which cooperates with a probe extending forwardly from the aircraft to be fueled, the drogue and probe forming a fluid-tight coupling for transfer of fuel between the aircraft.

The present invention features a system of articulated rigid conduits whereby the drogue is rigidly thrust down to a suitable distance below the tanker aircraft, and the drogue itself is on the end of a rearwardly extending conduit. That is, the system involves rigid downwardly extending conduit means cooperating with a rearwardly extending articulated section carrying the drogue. The articulated system is constructed and arranged to collapse, that is, to be retracted and folded back into a compartment formed in the lower part of a fuel tank carried by the tanker aircraft or into an integral compartment of the tanker aircraft itself, such as a bomb bay. The articulated system is arranged to collapse and fold into a compact package occupying a minimum of space in its compartment.

The articulated system features novel coupling and retracting arrangements, and it includes a universal joint between the downwardly extending section or sections and the rearwardly extending section. In the preferred form of the invention the downwardly extending conduit means is in the form of a pair of similar legs having connection to the universal joint or coupling from which a single leg or section extends rearwardly. The universal joint or coupling between the sections of course accommodates and allows for relative movement between the aircraft and facilitates engaging the coupling when the probe is initially thrust into the drogue.

The universal joint or coupling provides for universal movement while at the same time providing for transfer of fuel through it. The coupling features conduit sections journaled on trunnion members having openings providing for communication of fluid therethrough while at the same time permitting the relative swiveling movement.

In one form of the invention the articulated system is lowered and retracted by means of a flexible cable wound on a power driven reel or windlass. During lowering of the articulated system, power can be kept on the drive of the reel to apply torque so that suitable tension is maintained in the flexible cable to maintain control of the lowering of the articulated conduit system. Likewise, this device is used to apply torque in such a manner that cable slack is taken up as required due to maneuvers of the receiver aircraft while in the refueling position.

In another form of the invention which is a preferred form, the articulated system of conduits or pipes is extended and retracted by a hydraulic actuator. It is within the realm of the invention that the articulated system could be extended in any direction from the tanker aircraft. This system has the advantage of more positive control of the articulated system or assembly. It provides for better control in that it eliminates the problem of controlling the slack and tension in a flexible cable. The hydraulic actuator is also adapted to compactness of equipment and to automatic control by the pilot. The hydraulic actuator is controlled by a valve and electrically driven pump which are in turn controlled through an electrical circuit from the pilot's cockpit. The hydraulic system adapts itself to being automatically controlled to limit its lateral, up and down, and fore and aft movements.

The arrangement of this form of the invention features means whereby the hydraulic actuator is adapted for moving the single intermediate leg of the pipe system into its folded or collapsed position. This arrangement comprises an arm extending from the single intermediate leg or pipe which, in collapsing, causes a wheel to fulcrum against a track formed in the compartment for the pipe assembly so that in the last stages of movement the intermediate leg is caused to rotate counterclockwise about the universal joint into collapsed position.

In accordance with the foregoing, it is an object of the invention to provide an in-flight refueling system eliminating flexible hoses, and wherein a system of articulated rigid conduit sections can be extended outwardly from a tanker aircraft and then collapsed and folded into a compact compartment formed, for example, in a fuel tank carried by the aircraft.

Another object is to provide an in-flight refueling system as in the foregoing, wherein the articulated system includes a pair of outwardly extending legs coupled to a rearwardly extending leg by a universal joint capable of transferring fuel between the sections.

Another object of the invention is to provide power driven means for extending and retracting the articulated system and having controllable means for maintaining appropriate tension in the connections to the articulated system as it is extended.

Another object of the invention is to provide a universal fluid coupling or joint wherein conduit sections have portions swivelingly engaged on hollow cooperating trunnion members whereby fluid flow is permitted as between the conduit sections through the trunnion members and the universal movement as between the conduit sections is also permitted.

Another object of the invention is to provide an in-flight refueling system as in the foregoing, embodying a hydraulic actuator for retracting and extending the articulated system.

Another object is to provide an arrangement as in the foregoing object wherein the hydraulic actuator is attached to the two outwardly extending legs and an arrangement is provided so that when these legs are retracted an arm extending from the single intermediate leg engages with a fixed member in the storage compartment, causing the intermediate leg to rotate about the universal joint to bring it into folded or collapsed position.

Another object is to provide in accordance with the structure of the foregoing object a hydraulically operated latch to latch the articulated assembly in its folded or collapsed position.

Another object of the invention is to provide a control system for the hydraulic actuator and the hydraulic latch comprising a control valve and an electrical control system for controlling the supply of hydraulic power to the actuator and the latch and its release for extending and retracting the articulated system.

Further objects and numerous advantages of the invention will become apparent from the following detailed description and annexed drawings, wherein:

FIG. 3 is a side elevational view of the articulated system showing it in retracted position;

FIG. 3A is a partial side elevational view of the articulated system in extended position;

FIG. 3B is a side view partly in section of the universal coupling shown in FIG. 3A;

FIG. 3C is another view of the universal coupling shown in FIG. 3A;

FIG. 4 is a sectional view taken along line 4—4 of FIG. 3;

FIG. 6 is a sectional view taken along line 6—6 of FIG. 3;

FIG. 7 is a sectional view taken along line 7—7 of FIG. 3;

FIG. 8 is a sectional view taken along line 8—8 of FIG. 3 with the articulated system extended;

Figure 10:
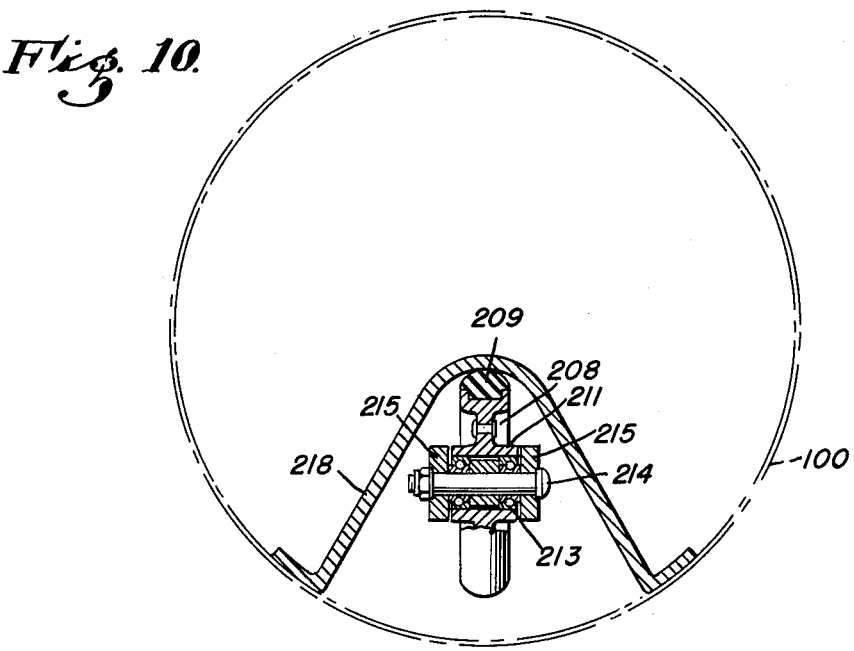
Figure 12:
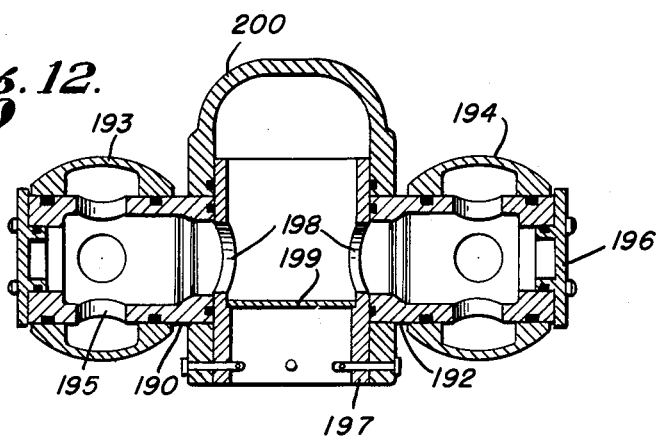
Figure 11:
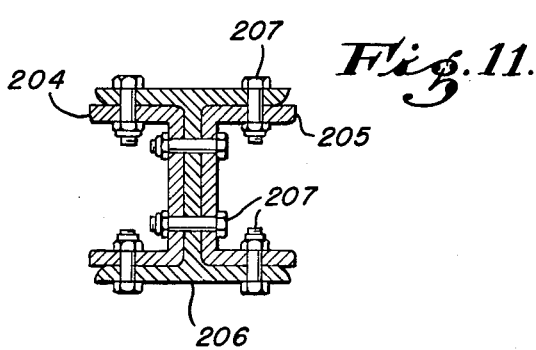
Figure 18:
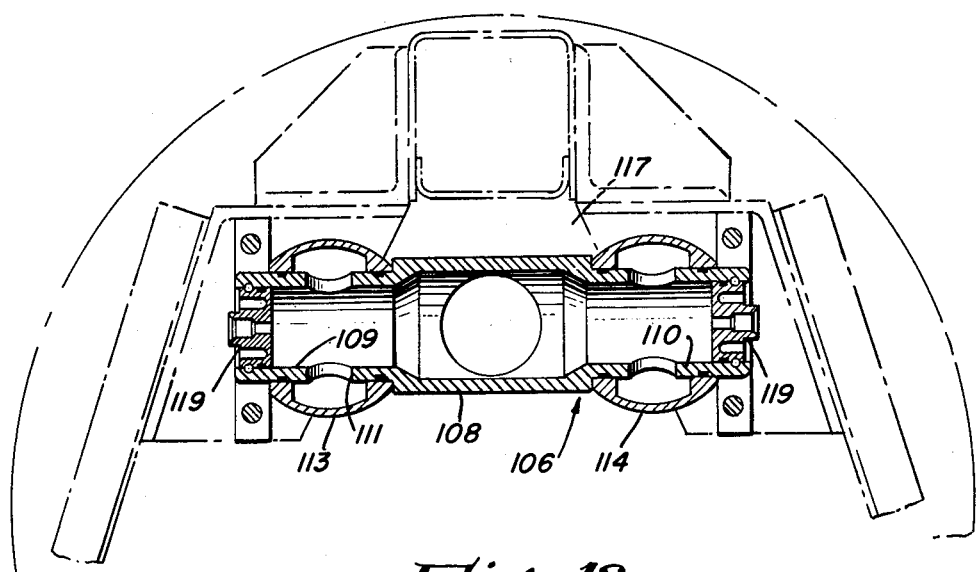
Figure 17:
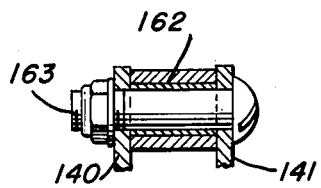

FIG. 9A of the drawings is a partial view of a second form of the invention showing it in collapsed position in its storage compartment;

FIG. 9B is a partial view of the second form of the invention as shown in FIG. 9A;

FIG. 10 is a sectional view taken along the line 10—10 of FIG. 9A;

FIG. 11 is a sectional view taken along line 11—11 of FIG 9A;

FIG. 12 is a sectional view taken along line 12—12 of FIG. 9A;

FIG. 13 is a sectional view taken along line 13—13 of FIG. 9A;

FIG. 14 is a sectional view taken along line 14—14 of FIG. 9B;

FIG. 15 is a sectional view taken along line 15—15 of FIG. 9B;

FIG. 16 is a sectional view taken along line 16—16 of FIG. 9B;

FIG. 17 is a sectional view taken along line 17—17 of FIG. 9B;

FIG. 18 is a sectional view taken along line 18—18 of FIG. 9B;

FIG. 19 is a schematic diagram of the hydraulic and electrical control system for controlling the hydraulic actuator of FIGS. 9A and 9B; and FIG. 20 is an elevational view of the articulated pipes and the hydraulic actuator in the extended position.

Figure 1:
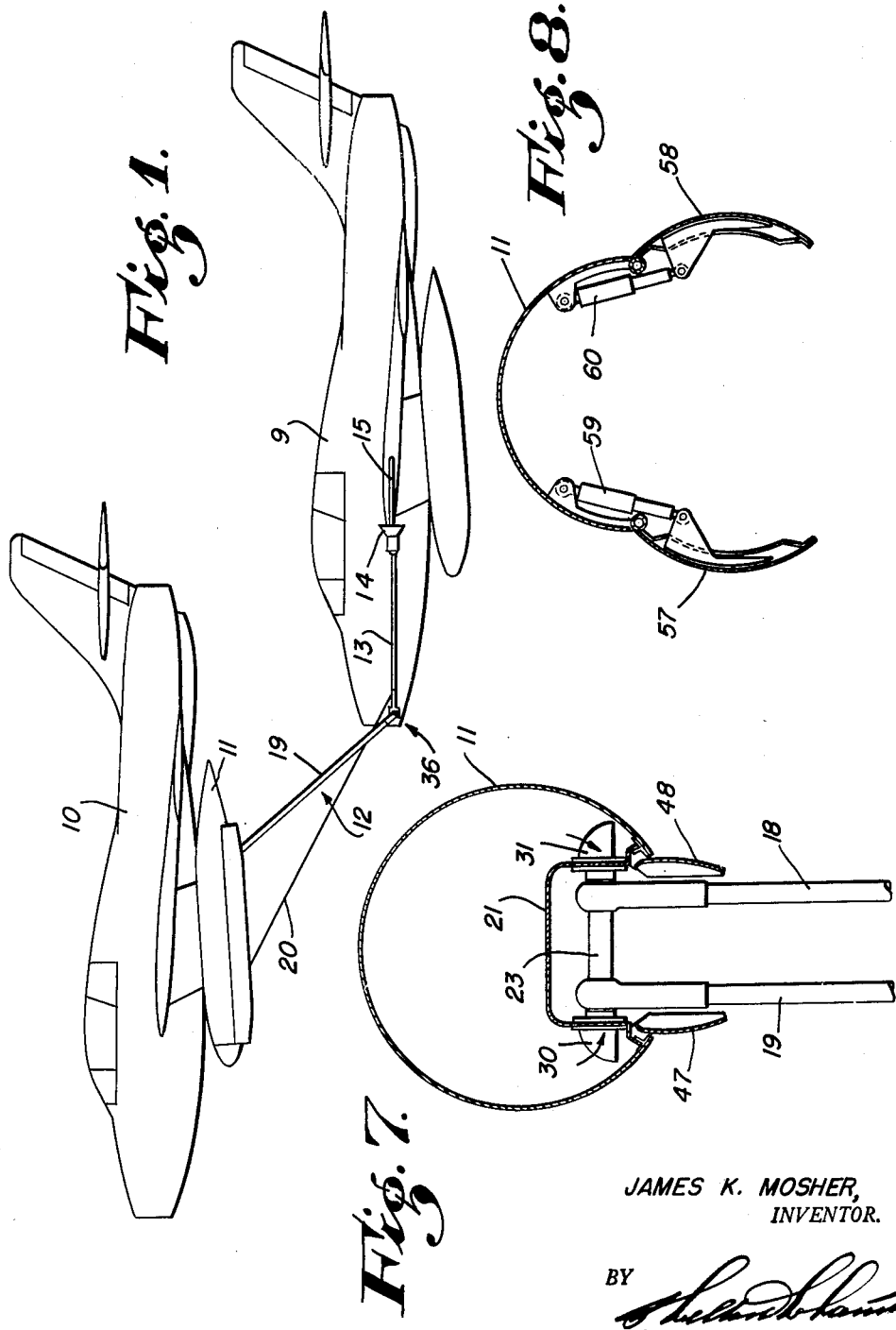
FIG. 1 is a side view of aircraft in flight, illustrating the refueling system of this invention.
Figure 2:
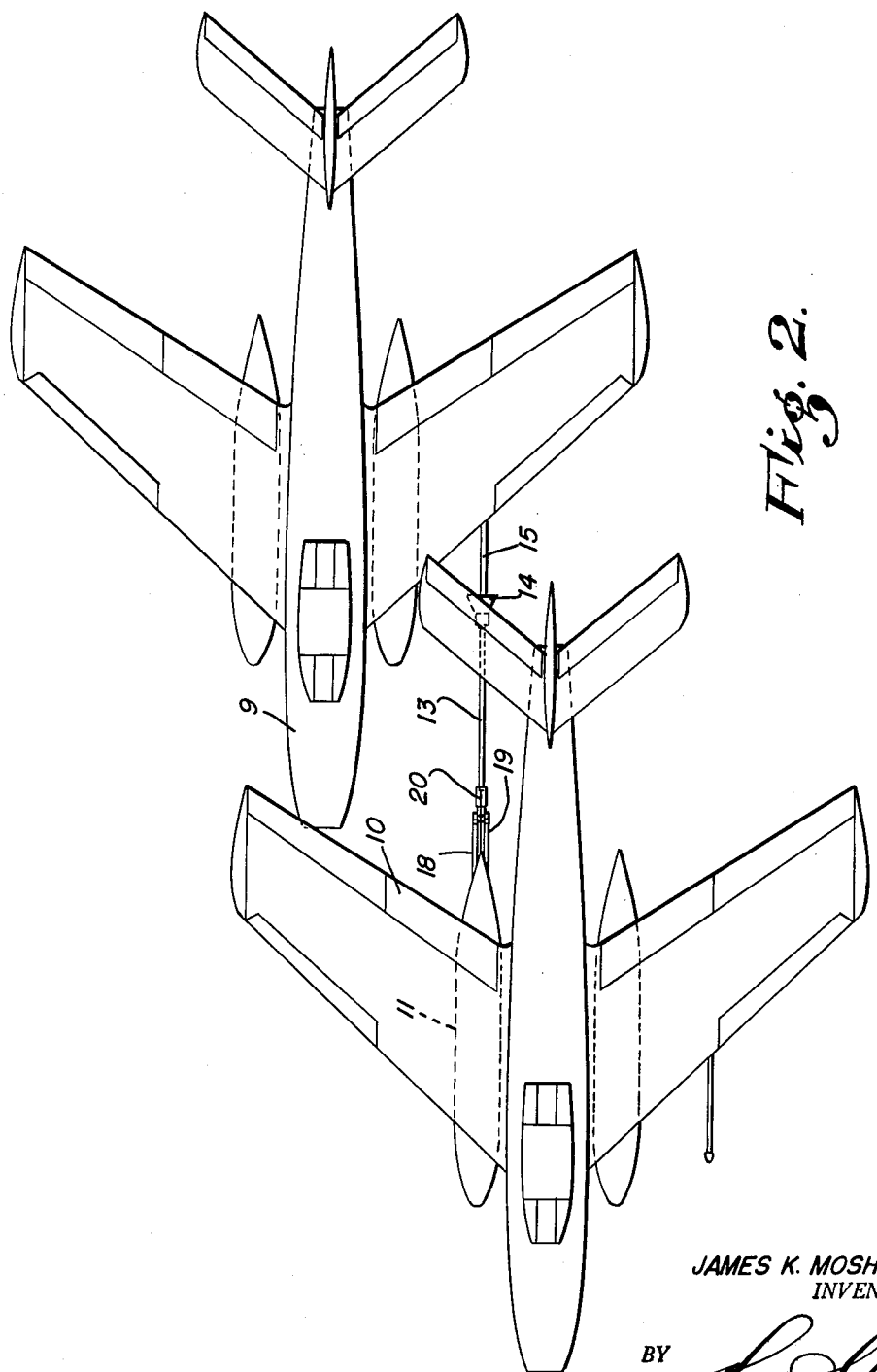
FIG. 2 is a plan view of the aircraft and the refueling system.

Referring now more particularly to FIGS. 1 and 2 of the drawings, numeral 10 designates a tanker aircraft, and 9 is an aircraft being refueled. The tanker aircraft has a fuel tank 11 having a compartment for the articulated fuel system as will be described. The articulated system is designated generally by the numeral 12. It has a rearwardly extending section 13 on the end of which is a drogue 14 which forms a fluid-tight coupling with a probe on the end of a conduit section 15 which extends forwardly from the plane to be refueled. As shown in FIG. 2, the articulated system involves a pair of similar outwardly extending legs 18 and 19 and it is retractable into the tanker aircraft by means of a flexible cable 20 as will be described more in detail presently. As can be observed, the articulated system makes it possible to rigidly thrust the drogue outwardly to a suitable distance below, to the side, or above the tanker aircraft. The elimination of a flexible hose avoids the disadvantage also that ordinarily the hoses are not able to withstand the low temperatures at high altitudes.

Referring now more particularly to FIG. 3 of the drawings, the fuel tank 11 is shown in cross-section, and as may be seen in the lower part thereof there is formed a housing 21 appropriate to enclose the articulated refueling system when it is collapsed and retracted. The housing 21 is shaped to enclose the drogue 14 and power driven mechanism for extending and retracting the articulated system as will be described. The drogue is in a portion of the housing designated 11a, and the retracting mechanism and the universal coupling in the system are enclosed in a portion of the housing designated 11b. The cross-sectional shape of the housing 21 is illustrated in FIG. 7.

FIGS. 3 and 3A show the articulated system both in collapsed and folded position and in extended position. The outwardly extending part of the system involves the pair of similar legs or sections 18 and 19 as may be seen in FIGS. 6 and 7. These sections are faired in cross-section as may be seen in the various figures, so as to minimize the wind resistance, that is, the drag. These two sections are joined by a portion 23 and they have transversely extending trunnion or bearing portions 25 and 26 as shown in FIG. 6, which are journaled in bearings 27 and 28 provided in the side walls of the housing 21 adjacent openings in the side walls of the housing 21 which communicate with the fuel tank 11. Numerals 30 and 31 designate inlet scoops or fittings attached to the sides of the housing 21 by bolts, as shown at 32 for example, providing for admission of fuel therethrough into the trunnions 25 and 26 communicating with the sections or legs 18 and 19. Suitable seals are provided by sealing rings between the trunnions and the bearings in which they are journaled, as shown for example at 34. From the foregoing it can be understood that the legs or sections 18 and 19 are operable to swivel or pivot around their mountings so as to extend outwardly, as shown in FIG. 3A. FIG. 7 shows these sections in extended position.

The legs 18 and 19 are connected to the single rearwardly extending section 13 by way of the universal joint or coupling, as generally designated at 36. The details of the universal coupling will be described presently.

When the articulated system is retracted it collapses into a compact package with the section 13 lying between the legs 18 and 19 and with the drogue housed as shown in FIG. 3 in the housing portion 11a. The universal coupling has an extending bracket 37 which in the retracted or collapsed position engages a spring latch 39 having a lever arm 40 with a roller 41 on its end which engages under a hook 42 forming part of the bracket 37. The lever 40 is normally urged in a clockwise direction by a biasing spring 43 on a stem 44 connected to the lever 40. The housing or compartment 21 is closed by a pair of doors 47 and 48 as may be seen in FIG. 4. The doors 47 and 48 are hinged to the lower part of the tank 11, and extending between them is a flexible cable 49 having its ends attached to the doors as shown. When the articulated system is retracted the leg or section 13 engages the cable 49 and folds the doors into closed position against the force of coil springs as indicated for example at 51, this spring being within a telescoping cylindrical assembly 52, one end of which is pivotally attached to the door 48 and the other end of which is fixed within the housing 21 as shown.

The articulated system is retracted and extended by means of a flexible cable as shown at 53, attached to a fitting 54 on the section 13. The flexible cable is wound on a power-driven reel or windlass as shown generally at 55 and which will be described more in detail presently. When the system is lowered, power is kept on the reel mechanism so that torque is applied and appropriate tension is maintained in the cable 53 to maintain the articulated system in a controlled position. When the system is lowered, the latch 39 is unlatched by any suitable means not shown.

The housing portion 11a which encloses the drogue in retracted position has a pair of arcuate hinged doors as shown at 57 and 58, which are controlled by spring actuators enclosed in cylinders as shown at 59 and 60. The doors 57 and 58 close when the drogue is retracted into its housing.

From the foregoing it will be observed that the articulated system can be lowered with the legs 18 and 19 swiveling around the mountings at their upper ends. The section 13 extends rearwardly and adapts itself or coupling with the probe extended forwardly from the aircraft to be refueled, the universal coupling 36 accommodating relative movement as between the aircraft; that is, the coupling 36 will accommodate both forward and lateral thrusting movement.

Figure 3D:
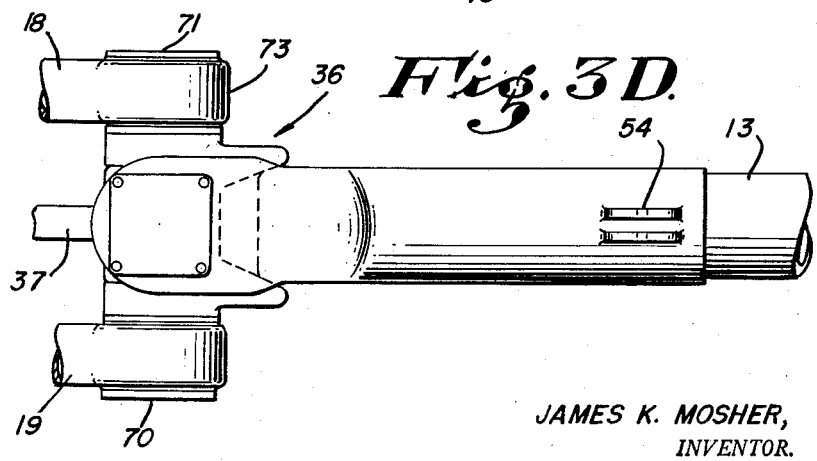
FIG. 3D is a plan view of the universal coupling shown in FIG. 3A.

Referring now more in detail to FIGS. 3B, 3C and 3D of the drawings, these drawings show the universal coupling 36 more in detail. The coupling 36 includes a cross-shaped fitting 60 from which the bracket 37 extends. The fitting 60 is hollow and it has oppositely extending portions 61 and 62 which form trunnions having openings as shown at 63. The conduit section 13 has a yoke formed at its end as shown in FIG. 3B, including portions 64 and 65, each of which is flattened to form a ring-shaped section as shown, for example, at 65, which section is journaled on the trunnion 62 as shown, so that the openings 63 provide communication with the portion 64. Suitable sealing is provided as shown for example, by the sealing ring 66. The fitting 60 has oppositely extending portions spaced at 90° from the portions 61 and 62, forming additional hollow trunnions as designated at 70 and 71 in FIG. 3C. These trunnions have similar openings as shown at 72, and the legs 18 and 19 are flattened at their ends so as to form a cylindrical portion as shown at 73 for example, which is journaled on the trunnion 71 and to which communication is provided through the opening 72. Similar sealing means are provided as shown by the sealing rings as, for example at 74. The bore 76 within the trunnion portions 70 and 71 communicates with the bore in the oppositely extending trunnions 61 and 62, one of the openings forming the intercommunication being shown at 77 in FIG. 3C. From the foregoing it will be observed that the sections 13 can swivel laterally or transversely on its trunnions, and the legs or sections 18 and 19 can swivel or pivot in a vertical plane on their trunnions. At the same time that these movements are permitted which provide for universal movement of the coupling, fluid flow therethrough is provided for through the fitting 60 and into the yoke portions 64 and 65 and into the section 13.

Figure 5:
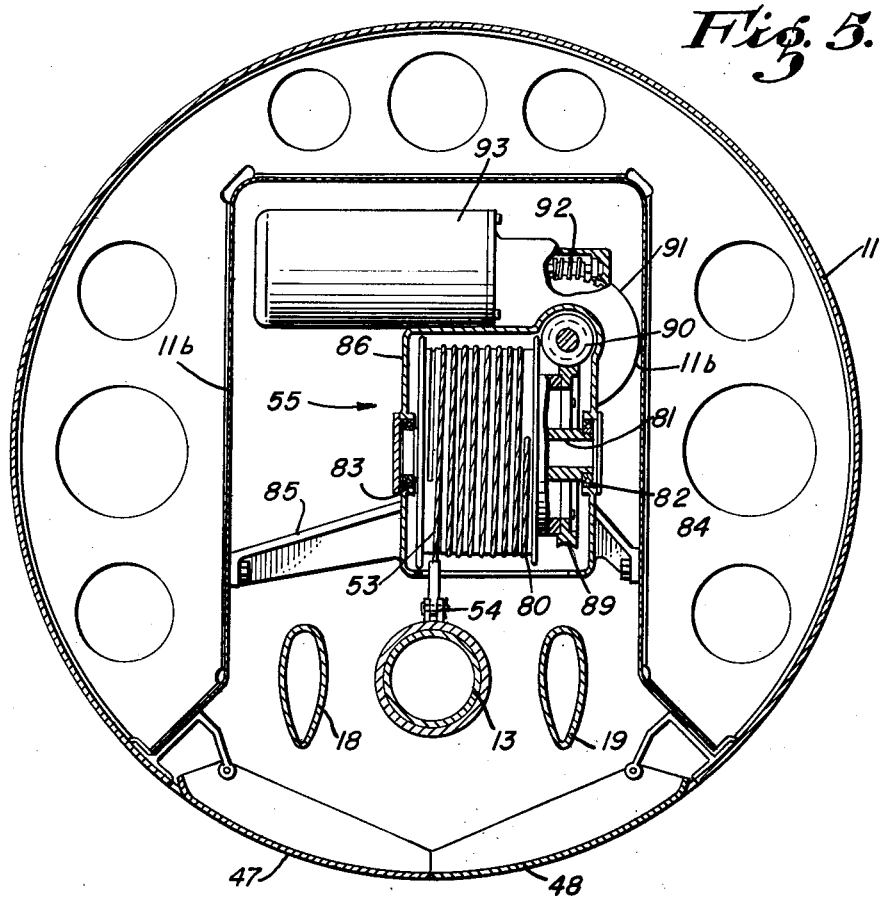
FIG. 5 is a sectional view taken along line 5—5 of FIG. 3.

Referring now more particularly to FIG. 5 of the drawings, this figure shows in greater detail the power driven windlass or reel mechanism by which the articulated system is extended and retracted. This mechanism includes a windlass or reel 80 on a shaft 81 journaled in bearings 82 and 83, mounted in a frame 86 which is supported from the sides of the housing portion 11b by brace members 84 and 85. The windlass or reel 80 is grooved as shown, and the cable 53 rides in the grooves. On the shaft 81 of the reel is a gear 89 which is driven by a worm gear 90. The worm gear 90 is on the same shaft as a larger driving gear within a housing 91 which is driven by worm gear 92 on the shaft of an electric motor within the housing 93. Suitable controls may be provided for the electric motor so as to maintain power thereon and to provide torque while the articulated system is being extended, that is, to provide appropriate tension in the cable 53 so at all times to have control of the articulated system. When retracting the articulated system, power is applied to the reel or windlass to wind in the cable 53, and the articulated system is then withdrawn or retracted and collapsed or folded up into the compartment 21 in the lower part of the tank 11, the doors closing after the parts are folded and fully retracted.

From the foregoing those skilled in the art will observe that the invention provides an in-flight refueling system wherein the drogue is rigidly extended to a position below, to the side, or above the tanker aircraft. The system dispenses with the use of flexible hoses. The articulated joints in the system, particularly the universal coupling between the outwardly extending legs and the rearwardly extending section provide for the collapsing and folding of the system, and accommodate it to the making of the coupling between the drogue and the probe and the maintenance of this coupling while refueling is in process. The system folds up compactly into the housing or compartment provided in the lower part of the fuel tank.

In another form of the invention which is further improved, the articulated pipe system is extended and retracted by means of a hydraulic actuator rather than a power driven reel. The hydraulic mechanism facilitates the extending and retracting of the pipe system and is further advantageous in that with the power driven reel considerable accelerating power is required to take up slack in the cable when the receiving plane as a result of maneuvering moves the drogue forwardly to put slack in the cable controlling the pipe system. Further advantages of this system are that the refueling members are not restricted to downward extension, but may be extended sidewardly or upwardly. The hydraulic system further adapts itself to automatic controls whereby the system can have a limited range of up and down and sideways movement to facilitate maneuvering of the receiving plane, but to provide for automatic retraction if the maneuvering causes the pipe system to move outside of this limited range in fore and aft and lateral, and up and down directions. The system using a hydraulic actuator is shown more in detail in FIGS. 9 to 19.

In FIGS. 9A and 9B of the drawings, there is shown an external fuel tank at 100 having a compartment 101 within it for storage of the articulated pipe system when it is collapsed into its storage space. In this form of the invention, the articulated system includes a pair of pipes or conduits 102 and 103 having neck portions as may be seen at 104 and these portions engage a fitting 106 (see FIG. 18) having trunnions adapted for providing rotatable fuel flow connection between conduits 102 and 103 and the fuel tank. The fitting 106 as shown in FIG. 18 has a transverse portion 108, the ends of which 109 and 110 form trunnions having openings therein as shown at 111. At the ends of the neck portions of pipes 102 and 103 are hollow fittings 113 and 114 which are rounded as shown and these fittings are journaled on the trunnions 109 and 110 in fluid flow relationship therewith. The fitting 106 and its portion 108 are a part of a fuel conveying structure 117 which conveys fuel from the tank to the fitting 106 and its trunnion members and then to the conduits 102 and 103. The ends of the trunnion members are sealed by suitable plugs as shown at 119. The trunnions are also in sealing relationship with the fittings 113 and 114 by way of sealing rings fitting in appropriate grooves as shown in FIG. 18.

The pipes 102 and 103 extend to the left, as shown in FIGS. 9A and 9B and at their left ends there is a universal joint as shown generally at 120, whereby these pipes are connected for fluid flow communication to the intermediate pipe or leg 123 of the articulated system. The pipe 123 forms the lower part of the articulated pipe system and carries the drogue 124. The lower leg or pipe 123 connects to the universal joint 120 in a manner providing for universal movement and it is in a position midway between the two upper pipes or legs 102 and 103. The drogue 124 is at the trailing end of the pipe 123 and it has a flaring mouth as described in connection with the previous embodiment. The drogue is attached at the end of the tube 123 by a ball connection 125 providing for limited universal movement of the drogue 124 relative to the tube 123.

The hydraulic actuator or actuating cylinder is shown at 127. At its left end it has a coupling or fitting 128 having an extending arm 129 which fits between brackets 130 and 131 rigidly attached to the tank structure (see FIG. 13). The arm 129 is pivoted between these brackets on a bolt 133 having a hemispherical bearing 134 on it to provide for friction free movement of the actuating cylinder. The actuating cylinder has within it a pressure operated piston as will be described which is adapted to cause the actuator to be extended and retracted to operate the articulated pipe system. The operation will be described more in detail presently.

At the right end of the hydraulic actuator 127 is a fitting 137 from which extends an attaching arm 138, as shown, (see FIG. 15). The arm 138 has a circular opening and it fits between bracket arms 140 and 141 extending from a frame as indicated at 143, as shown in FIG. 15. The arm 138 is pivotally attached between the brackets 140 and 141 by means of a bolt as shown at 146, having a hemispherical bearing 147 as shown to provide for friction free operation. The frame structure 143 forms part of a structure having hemispherical portions on opposite sides as shown at 150 and 151, cooperating with hemispherical members 152 and 153, these members having extending lugs as shown whereby they are respectively secured together about the tubes 102 and 103 by bolts as shown at 156. Extending downwardly from the cross piece 143 of the frame structure is a bumper member 157 which is engaged by the pipe 123 when the articulated system is in collapsed position. By means of the above described attachment of the hydraulic actuator to the two parallel pipes, the articulated pipe system can be retracted, the single pipe being pulled to a position collapsed adjacent to the two pipes in a manner which will be described presently.

When the articulated pipe system or assembly is in the folded or collapsed position in its compartment in the tank 100, it is held in that position by an uplock or latch which will now be described. This mechanism involves a hook shaped lever 160, which is arranged to hook under a roller 162 rotatably mounted on a bolt 163 which extends between extending portions of the bracket arms 140 and 141 referred to in connection with the description of FIG. 15 (see FIG. 17). The hook member 160 is bifurcated at its end and as shown in FIG. 16 it is mounted on a bushing 165, which is in turn mounted on a bolt 166 extending between portions of a bracket 167, suitably secured to the structure within the storage compartment for the articulated system. Engaged between the bifurcated ends of the hook member 160 is a bell crank operating lever 169 which is attached to the operating mechanism for the uplock, as will be described. Numerals 170 and 171 designate coiled torsion springs mounted around the bushing 165 which are arranged to normally cause the hook member 160 to be in a clockwise rotated position as seen in FIG. 9B. The hook member 160 is operated by a hydraulic cylinder 175 which has a stem 176 pivotally connected to the bell crank lever 169, the end of which is bifurcated as shown in FIG. 16. The attachment between these members is by way of a pin shown at 177. When the articulated pipe system is to be extended, the cylinder 175 operates to retract stem 176 and this unlatches or unlocks the uplock mechanism, allowing the main hydraulic cylinder to extend the articulated pipe system outwardly.

FIG. 14 is a sectional view similar to that of FIG. 15 taking along the line 14—14 of FIG. 9B. FIG. 14 shows the two pipe sections 102 and 103 and the structure attaching them together as shown in FIG. 15. Supported from the compartment structure 101 is a bracket assembly 180 and supported from and attached to this bracket by bolts as shown is an electrical switch 181 having an operating stem 182 which is adapted to be operated by a bracket or pusher 183 attached to the frame structure 143 extending between the pipes 102 and 103.

As previously described, the double pipes 102 and 103 are connected to the single pipe 123 by way of a universal joint designated generally at 120. This joint provides for universal movement and provides for flow of fuel from the double pipes 102 and 103 into the single pipe 123. The universal joint 120 is shown in more detail in FIG. 12. The universal joint comprises a cross member designated at 190 which forms trunnions at its ends on which are journaled rounded circular fittings at the ends of the two tubes 102 and 103. The trunnions are designated by the numerals 190 and 192 and the fittings at the ends of the pipes 102 and 103 are designated by the numerals 193 and 194. The trunnion members have openings therein as shown at 195 so that the fuel from the tubes 102 and 103 can pass into the ends of the trunnions. The ends of the trunnions are closed by suitable plugs as shown at 196. The fittings 193 and 194 are in sealing engagement with the trunnions by way of suitable sealing rings fitting in grooves as shown. The member 190 has extending transversely through it a circular member or fitting designated by the numeral 197, having openings as shown at 198 in its side walls so that the fuel from the inside of the ends of the trunnions can pass into the fitting 198. The member 190 is sealed to the fitting 197 by way of sealing rings and suitable grooves as shown. Fitting 197 has a transverse disc 199 therein so that flow is out of its upper end. The end of the single pipe 123 is enlarged as shown at 200 and it is shaped to form a fitting in rotatable or swiveling engagement with the fitting 197. It is in sealing engagement with the fitting 197 by reason of sealing rings fitting in grooves as shown. As can be seen, therefore, fuel from the pipes 102 and 103 can pass through the trunnions into the interior of fitting 197 and then into the pipe 123. The joint provides for universal movement in that the single pipe 123 can swivel in a horizontal plane while the two pipes 102 and 103 can swivel at the universal joint in a vertical plane.

In retracting the tube assembly from an extended position, the two pipes 102 and 103 are drawn back up into their compartment by the hydraulic actuator. In this operation the single pipe 123 is caused to rotate about the universal joint into a retracted position in a manner which will be described presently.

Universal joint 120 has formed as a part thereof extending brackets designated by the numerals 204 and 205. These brackets are shown more in detail in the cross-sectional view of FIG. 11. These bracket members are channel shaped as shown and attached to them is an arm 206 which has the cross-sectional shape of an H as shown, and its end fits between and over the bracket members as shown in FIG. 11 and the bracket members and the end of the arm are bolted together as shown by the bolts 207 as indicated. At the left end of the arm 206 there is mounted a wheel or roller 208. This wheel has a tire which may be made of rubber or Teflon, as shown at 209 in FIG. 10. The wheel has a hub 211 and within this hub are bearings as shown at 213, mounting the wheel on a transverse shaft formed by bolt 214. The shaft 214 is journaled in the bifurcated end portions 215 of the arm 206. The wheel 208 engages a track positioned above the wheel which is channel shaped as shown at 218 in FIG. 10. This track is rigidly attached to the interior structure of the compartment, that is, the fuel tank 100.

The operation of the arm 206 and the wheel 208 is that when the articulated pipe assembly is being retracted by the hydraulic actuator, the wheel 208 will initially engage the track 218 near the right end of this track with the arm 206 and the center tube 123 in a clockwise rotated position. As the hydraulic actuator continues to draw the tubes 102 and 103 upwardly, during the last stages of movement while the universal joint is being drawn inwardly, the wheel 208 fulcrums against the track 218, forcing the arm 206 and the center tube to rotate in a counterclockwise direction about the universal joint until in the fully retracted position the parts assume the position shown in FIGS. 9A and 9B. With reference to the tubes 102 and 103, these tubes are constructed so that they normally have a slight bow outwardly. During the retracting operation, the force applied by the hydraulic actuator puts a stress in these tubes which tends to and does straighten them out so that in the fully retracted and locked position there is a stress or tension in these tubes. When the up lock is released for extending the articulated tube system, the effect of the stress or tension in these tubes is that this stored energy acts to cause the universal joint to move outwardly as the tension is released. That is, to start the articulated pipe system toward the extended position. Positive energy means are therefore provided within the structure itself for positively assuring that upon starting the extending operation, the system will move out and start outwardly. The geometrical relationship of the parts, of course, obviously is such that after the articulated system has been extended outwardly a certain amount, the components of actuating force which can be applied by the hydraulic actuator increase considerably.

Referring now to FIG. 19 of the drawings, this is a schematic simplified view of the tank with the articulated pipe system in extended position and showing the hydraulic system in simplified form and the electrical system whereby the extending and retracting of the articulated system is controlled from the pilot's cockpit.

With reference to the hydraulic actuator 127, it has a piston therein designated at 219 which actuates the stem which, as described above, is attached to the upper two pipes of the tube assembly. The piston 219 operates to the left for retracting the pipe assembly and it is moved to the left by hydraulic pressure. The hydraulic pressure is provided by an electrically driven pump having a motor, this pump and motor being designated by the numeral 220. Numeral 221 designates the pressure line from the pump and numeral 222 designates the return line. The pressure to the hydraulic actuator is controlled by a four-way two position solenoid operated hydraulic valve designated by the numeral 225. This valve has four connections to it as shown as 226, 227, 228 and 229. It has a rotary member having passages in it as shown which are able to bridge, that is, connect in the position shown passages 226 and 227 and also passages 228 and 229. In its other position, passages 226 and 228 are connected and passages 227 and 229 are connected. In one position it causes pressure to flow to the hydraulic actuator for actuating it to retract the articulated pipe system and in its other position it releases this pressure from the hydraulic actuator. When pressure is being released from the hydraulic actuator, pressure is applied to the uplock operating cylinder for releasing the uplock. Also, when pressure is released from the hydraulic actuator, that is, for extending the articulated pipe system, pressure is applied to actuators for doors, closing the compartment which houses the articulated system for opening these doors. (These doors are not shown on the drawing.)

For extending the articulated pipe system, the parts are initially in the position shown in FIG. 19. The pump motor 220 is started and this produces a flow of pressure through the solenoid valve 225 from connection 228 to 229 and then through a pipe 233 to a plunger valve 234. Pressure is also applied to the door openers (not shown); when the doors open the stem of valve 234 is mechanically actuated. Valve 234 comprises a cylindrical housing 235 having a plunger valve member 236 therein normally biased by a coil spring 237. The outlet pipe from the flow controller 234 is shown at 240 connecting to the underside of the piston in the hydraulic actuating cylinder 175. Thus, after the doors open, the uplock is released.

At this time, the right side of the piston 219 in hydraulic actuator 127 is freely connected through the solenoid valve 225 to the return line of pump 220 by way of pipes 242, 243 and 222. Also, the upper side of the piston in actuator 175 is freely connected to the return line through the pipe 244. Thus, the hydraulic pressure acts to release the uplock and the hydraulic actuator 127 operates to cause the piston 219 to move to the right upon release to pressure with the articulated pipe system being extended.

In FIG. 20 the articulated pipes are shown to be in the extended position with the roller 162 disengaged from the hook-shaped lever 160 and with the actuator arm 138 fully extended out of the actuator 127.

For retracting operation, the piston of valve 225 is reversed as described above. Under these circumstances, the supply of pressure is from pipe 221 to 243 and thus pressure is applied to the top side of the piston in actuator 175 and to the right of the piston 219. This causes the articulated pipe system to be retracted as described above. The lower side of the piston in actuator 175 is now connected to the return line through the valve 234.

As previously pointed out, the pump 220 is electrically driven by a motor and it is controlled by a switch 250 actuatable by the pilot. This switch has contacts 251 and 252 for retracting and extending the articulated system respectively. Contact 251 is connected by wires 253 and 254 to winding 255 of a relay 256 which controls a pair of contacts 257, controlling the circuit to the electric pump motor 220. The relay contacts 257 control power from a source of power through a wire 258 and wire 259 to the pump motor 220. The contact 251 also controls a circuit through the wires 253 and 261 to the solenoid of the valve 225 to actuate it at the same time that the pump motor 220 is started.

For extending the articulated pipe system, the contact 252 is engaged and it makes a circuit through wire 263, wire 264, limit switch 182 and wire 266 to the winding 267 of a relay 268 which controls relay contacts 269. These contacts control the source of power from the wire 258 and through a wire 270 and wire 259 to the electric pump motor 220. The limit switch 182, as previously described is a switch which is mechanically actuated by the hydraulic actuator, that is, by the articulated pipe system such that it is closed when the system is fully retracted so that the doors may also be closed, the latter not being possible when the switch is open. Thus, it is closed while the system is retracted and until the uplock is released, upon the opening of the doors as indicated previously. It will be seen that for extending the system the solenoid operated hydraulic valve 225 is not energized and it accordingly is in the opposite position to that which it is in for retracting.

When the system is operated to extend, when contact 252 is engaged, an additional circuit is completed through wire 272 to a switch 273 which is mechanically operated by the articulated pipe system and which is closed when the articulated system is in the fully extended, that is the full trail position. This switch then energizes a circuit through the wire 274 to a signal light 275 on the forward end of the tank 100 to indicate that the drogue is extended and in full trail position ready for the receiver aircraft to make engagement therewith.

The foregoing disclosures are representative of two forms of the invention and it is intended that they be illustrative of rather than limiting upon the scope of the invention. Various alternatives and modifications may be adopted by those skilled in the art without departing from the spirit and scope of the invention which is to be in accordance with the claims appended hereto.

I claim:

1. In an in-flight refueling system for an aircraft having a tank and means to carry a refueling system adapted for connection to the tank, the improvements comprising a refueling drogue; means comprising a system of rigid articulated pipe sections adapted to provide a flow connection between the tank in the aircraft and the drogue, the articulated system being constructed and arranged for extension into a position wherein the drogue is rigidly extended to a position outwardly and rearwardly of the aircraft, the articulated system being collapsible into a folded position within the aircraft; means including a hydraulic actuator for positively moving the articulated pipe system between extended and retracted positions; and means whereby in collapsed position of the system a bending stress is maintained in one of the pipe sections whereby when said stress is released it acts to provide an impulse against the aircraft, tending to urge the articulated pipe system outwardly toward extended position.

2. The structure of claim 1, including a hydraulic latch member for latching the pipe system in retracted position with the said bending stress in one of the pipe sections.

References Cited in the file of this patent

UNITED STATES PATENTS

| | | |
|---|---|---|
| 217,006 | Holland | July 1, 1879 |
| 751,273 | Fahrney | Feb. 2, 1904 |
| 2,692,102 | Cobham et al. | Oct. 19, 1954 |
| 2,879,016 | Haase | Mar. 24, 1959 |
| 2,879,017 | Smith | Mar. 24, 1959 |
| 2,949,265 | Person | Aug. 16, 1960 |

FOREIGN PATENTS

| | | |
|---|---|---|
| 206,404 | Germany | June 26, 1908 |

OTHER REFERENCES

Aviation Week, vol. 63, No. 7, Aug. 15, 1955, pages 53 and 55.